Nov. 29, 1932.   E. J. SIEMERS   1,889,184
BEEHIVE INSULATOR
Filed Aug. 17, 1931   2 Sheets-Sheet 1

INVENTOR.
Emil J. Siemers

BY
*Lancaster, Allwine and Rommel*
ATTORNEYS.

Nov. 29, 1932.　　E. J. SIEMERS　　1,889,184
BEEHIVE INSULATOR
Filed Aug. 17, 1931　　2 Sheets-Sheet 2

INVENTOR.
Emil J. Siemers
BY Lancaster, Allwine and Rommel
ATTORNEYS.

Patented Nov. 29, 1932

1,889,184

UNITED STATES PATENT OFFICE

EMIL J. SIEMERS, OF EAU CLAIRE, WISCONSIN

BEEHIVE INSULATOR

Application filed August 17, 1931. Serial No. 557,709.

This invention relates to bee hive insulators for enclosing and protecting bee hives during the cold season.

It is well known that bees in bee hives which have not been protected from the cold are easily killed or so weakened that they are later of little worth in making honey. It is also established that, when cold bees eat of the stored honey in order to increase their body warmth and in doing so frequently over-eat, they become victims of dysentery and, unless warm weather follows, they die. In addition, it is also established that in localities where the nights are cold but where the temperature rises sharply during midday, bees suffer from the extremes of temperature in unprotected bee hives, and it is desirable to have the hives insulated in such a manner that the temperature within the hives remains fairly uniform.

The primary object of this invention is to provide a strong, but easily handled insulator which may be placed about bee hives without lifting the casing wall structures of the insulators over the bee hives or lowering the hives into the wall structures.

Another object is to provide an insulator which may be placed about bee hives, with insulating material between the bee hives and the casing wall structure of the insulator, for protecting the bee hives from cold, and which insulating material and the wall structure may be very readily removed when the need for them has ceased.

Another object of the invention is to provide a casing wall structure for a bee hive insulator which, when not in use, may be folded, compacted, and stored, taking up but little space.

A still further object of the invention is to provide a bee hive insulator which may be manufactured at a low cost, but which will be efficient and durable.

Other objects and advantages of the invention will be apparent during the course of the following detailed description, taken in connection with the accompanying drawings, forming a part of this specification, and in which drawings, Figure 1 is a perspective view of the improved casing wall structure, partly closed and housing a bee hive.

Figure 1:
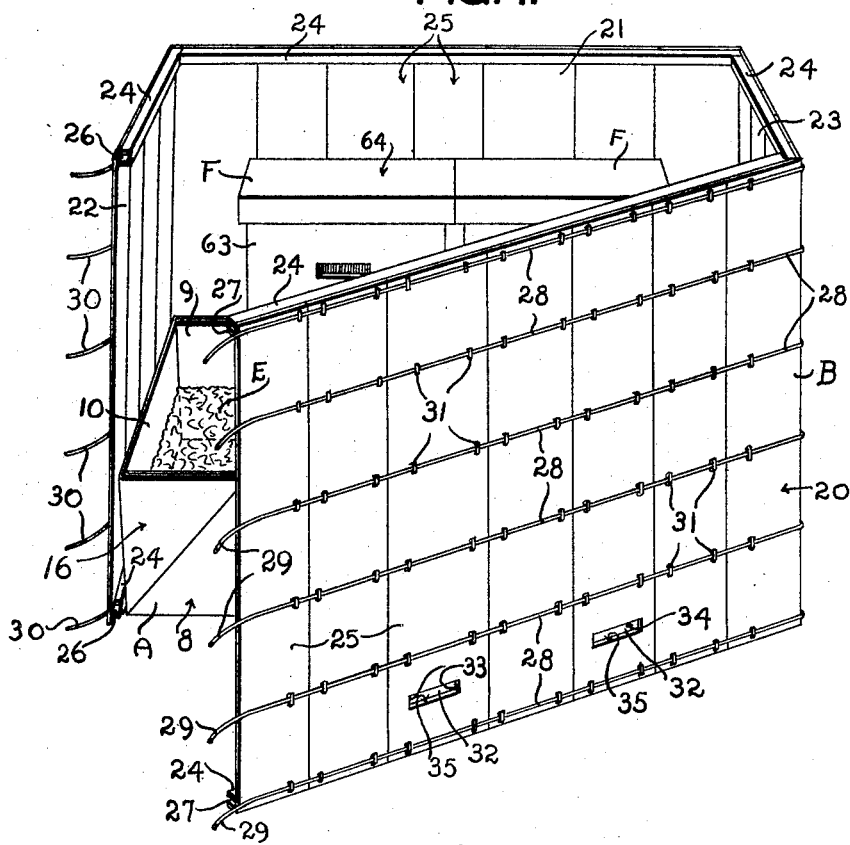

In the drawings, wherein for the purpose of illustration is shown only a preferred embodiment of the invention, A may generally designate a tray, B a casing wall structure enclosing the sides of the tray, C a roof carried by the casing wall structure, D a covered entrance way leading from the exterior of the casing wall structure, E insulating material, and F the bee hive enclosed by the insulator and to which the covered entrance way leads.

Figure 6:
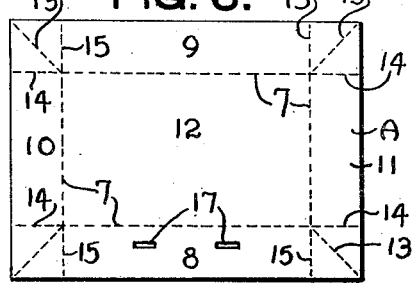
Figure 6 is a top plan view of an unfolded tray, forming a part of the insulator.

The tray A may comprise a single, preferably rectangular sheet of tarred paper or similar material which is impervious to moisture and repellent to rodents and the like. This sheet, shown in Figure 6, is folded along the lines 7 so that the portions 8, 9, 10 and 11 are upstanding forming walls, while the lowermost portion 12 forms the bottom or base of the tray. The square corner section, when folded along the lines 13, 14 and 15, as is well known, may be disposed of as shown at 16 in Figure 1. In at least one wall,—for example, the portion 8 in Figure 6,—are provided rectangular apertures 17 for a purpose later described. While the height of the walls of the tray are shown in Figure 1 as a little less than one-third of the height of the casing wall structure B, it should be understood that walls of this tray may extend the full height of the wall structure.

As to the casing wall structure B, the same includes side walls 20 and 21 and end walls 22 and 23. At the inner upper and lower edges of the four walls are cleats 24 to which the boards 25 forming the walls are nailed or otherwise secured. The ends of the cleats are joined by tongues 26 and grooves 27. The four walls are firmly joined together by parallel wires 28 which extend entirely around the walls and terminate beyond the walls 20 and 22, forming tie ends 29 and 30. The wires 28 are spaced apart and secured to the wall boards 25 by staples 31 or the like. It is preferred that the wires 28 be of flexible, galvanized or rust-proof material. In at least one wall of the casing wall structure,—as, for example, portion 20,—are small rectangular apertures 32 communicating with the interior of the casing wall structure. It is preferred that the end walls 33 of the apertures 32 be narrow and the top and bottom walls 34 and 35 proportionately wide, and that these apertures align with the apertures 17 in the tray A. When the tray is in place at the bottom of the casing wall structure B, and the walls of the tray are enclosed and supported against outward movement by the said walls of the wall structure.

Figure 4:
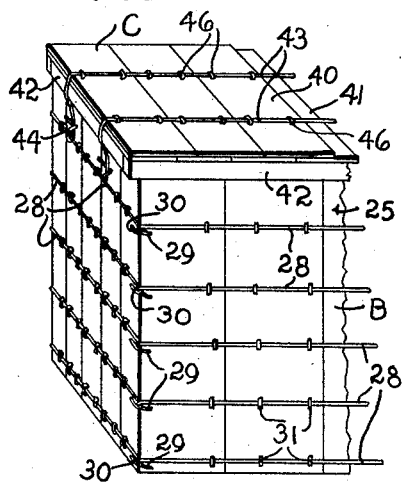
Figure 4 is a fragmentary perspective view of the casing wall structure closed, with the roof in place as it appears when in use.
Figure 3:
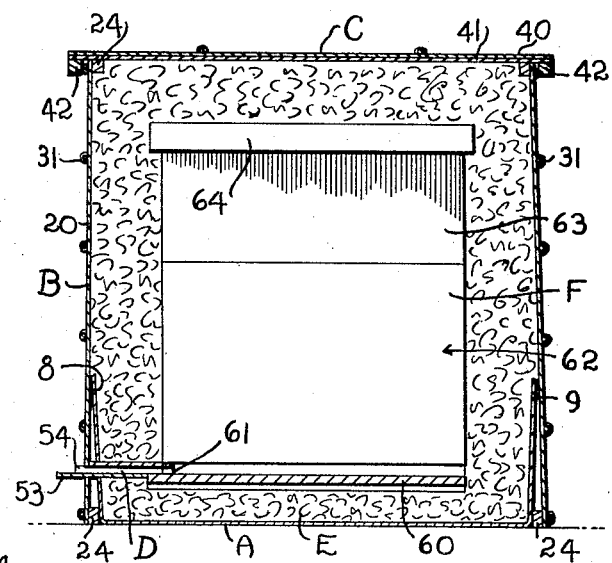
Figure 3 is a section on the line 3—3 of Figure 2.

The roof D is preferably made up two-ply and comprises boards 40 and 41, with joints overlapping and may be covered on the exterior with a weather-proofing material (not shown) such as roofing cement. The roof is preferably long and wide enough to extend over the top edges of the wall sections 20, 21, 22 and 23 and terminates in downwardy extending cleats 42 which aid in holding the roof on the casing wall structure. Parallel wires 43 extend over the top of the roof with their free ends extended beyond the roof forming tie ends 44 and 45 for extending under the wires 28 and twisting upon themselves as is illustrated in Figure 4, this being an additional means for securing the roof to the casing wall structure. These wires 43, like the wires 28, are preferably of flexible, galvanized or rust-proof material and are secured to the roof boards 40 by staples 46 or the like. While in the example shown, the roof is substantially horizontal, it should be understood that the roof could be sloped in one direction, away from the covered entrance way D, so as to more readily shed water.

Figure 5:
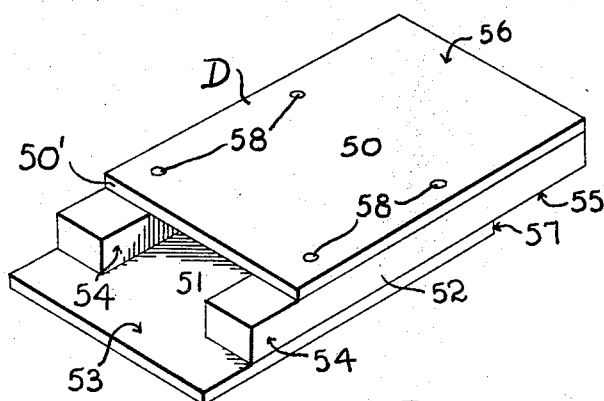
Figure 5 is a perspective view of a covered entrance way, employed in the construction of the insulator.

The covered entrance way D, preferably comprises a hollow rectangular body made up of a top wall 50, a bottom wall 51, offset from the top wall as shown in Figure 5 and side walls 52 preferably extending the length of and beyond the end 50′ of the top wall 50 and short of the end 53 of the bottom wall 51 as is also illustrated in Figure 5. Thus the end 53 of the bottom wall 51 forms a platform or landing while the extending ends 54 of the side walls 52 form wind breaks. The rear bottom edges 55 of the side walls, the rear portion 56 of the top wall and the rear end 57 of the bottom wall form the bee hive engaging portion of the covered entrance way. This portion D may be constructed of wood, joined together with nails 58 or the like.

As to the insulating material E, this may comprise chaff, dry leaves, wood shavings, or similar material which may be easily secured about an apiary or farm.

Figure 2:
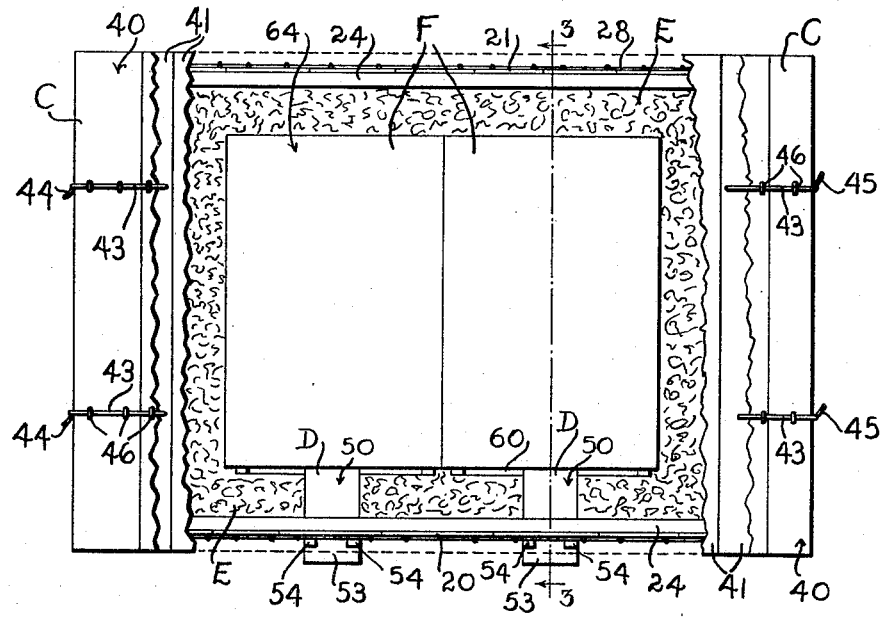
Figure 2 is a top plan view of the casing wall structure with a roof therefor, partly broken away, revealing details of construction.

The bee hive F may be of any approved kind and, in the example shown, comprises a bottom board 60 providing an entrance 61 to the hive, a hive body 62, a honey compartment 63, and a hive cover 64. In Figures 1 and 2 it will be noted that two bee hives are set close together and accommodated within one insulator.

In setting up the improved insulator about the bee hive, if the ground is apt to become moist or it is desirable to protect the bee hives from rodents or prevent them from nesting in the insulating material, the tray A may be placed under the bee hive, with several inches of insulating material between the bottom board 60 of the bee hive and tray.

The amount of material under the bottom boards should be enough when compacted to elevate the bee hives so that the entrances 61 are on a level or slightly above the apertures 32 in the casing wall structure B. Since the tray A is constructed of tarred paper or the like, it may be bought in rolls, cut up as required by the user of the insulator, or it may be furnished as a part of the insulator. Tarred paper is relatively cheap in price but efficient for the purposes sought. The walls of the tray are next creased and formed as heretofore set out.

The covered entrance way D may next be placed in position by inserting the rear ends thereof into the entrance 61 of the bee hives so that the portion 56 of the covered entrance way is slightly underneath the bottom of the chamber 62, the rear bottom edges 55 of the side walls resting on the top of the bottom board 60 and the rear ends 57 of the bottom wall abutting the end of the bottom board 60. The free end of the covered entrance way D is now slipped through the rectangular aperture 17 in the tray A. It will be apparent that the covered entrance way is now supported temporarily by the hive body and in the bottom board of the bee hive and in turn it supports a wall of the tray.

Next, the casing wall structure B is set up about the bee hive and the tray A. Since the casing is bottomless and one end of one wall thereof is detachable from the adjacent wall and may be swung outwardly or inwardly, due to the flexible wire 28 which attach it permanently at the other end of the adjacent wall, the entire casing may be set up without lifting it over the bee hives or lowering the bee hives into it.

With the casing wall structure about the bee hives, and three walls of the tray A within three walls of the casing wall structure and supported by them, the remaining wall 20 of the casing wall structure may be swung inwardly, until the tongues and grooves of the cleats 24 meet and then the free ends of the wires 28 may be twisted together as shown in Figure 4. Of course it may be necessary to guide the free ends of the covered entrance way D through the aperture 32 in the wall 20 so that the portions 53 and 54 will project without the casing and the ends 50' of the top wall of the covered entrance way will abut the inside wall of the portion 20 of the casing wall structure. Thus the covered entrance way communicates with the outside of the casing and the interior of the bee hive but prevents communication with the space between the bee hive and the surrounding casing wall structure. Bees may alight on the platform 53 and crawl into the hive along the covered entrance way, which will also supply fresh air to the hives. In the example shown, the covered entrance way is substantially horizontal, but it is to be understood that this may be sloped slightly downwardly from the bottom board of the bee hive.

With the portions A, B, D and F in place, and insulating material below the bee hives, additional insulating material may now be passed about and over the bee hives until the casing is full. Then the roof C may be adjusted in place, supported by the casing, and with the cleats 42 outside the casing wall structure. The ends 44 and 45 of the wires 43 are slipped under the wires 28 of the casing wall structure, and twisted as shown in Figure 4.

When the use of the insulator has passed for the season, the roof is removed by untwisting the ends of the wires 43. The ends 29 and 30 of the wires 28 are next untwisted and the wall section 20 swung outwardly and the casing wall structure removed from about the tray, insulating material, covered entrance way, and bee hives. It is only necessary to move the entire casing wall structure horizontally in order to do this. If the insulating material does not fall away from the hive, it may be quickly and readily removed, since there will be nothing in the way. When opportune, the covered entrance ways are then removed and the tarred paper tray torn from about the bottom of the hive which need not be moved at all.

The casing wall structure B may be extended, by bending the wires 28 so that the entire casing wall structure will be flat, or each of the wall sections may be folded upon the next one. In either case, with the flat roof and covered entrance ways, the entire structure will take up but little storage space. The trays, being of inexpensive material, may be thrown away and the insulating material similarly disposed of as desired.

Changes in detail may be made to the form of invention herein shown and described, without departing from the spirit of the invention or the scope of the following claims.

What is claimed is:

1. In a bee hive insulator a separable casing wall structure provided with an aperture through a wall thereof.

2. In a bee hive insulator a separable casing wall structure including a wall section having an end thereof detachable from an adjacent wall section said first named section provided with an entrance aperture adjacent the bottom thereof.

3. A bee hive insulator comprising a separable casing including wall sections and flexible means joining the wall sections together with one of the wall sections detachable from the adjacent wall section at one end thereof and a roof for the wall structure, said wall structure and roof adapted to be set up about a bee hive.

4. A bee hive insulator comprising a separable casing including wall sections and means detachably securing one end of one wall section to the adjacent wall section and permanently securing the other wall sections to their adjacent wall sections and a roof for the wall structure, said wall structure and roof adapted to be set up about a bee hive.

5. In a bee hive insulator a separable casing wall structure, a tray positioned at the bottom of said casing wall structure, the wall sections of said structure enclosing the walls of said tray.

6. In a bee hive insulator a separable casing wall structure, a collapsible tray positioned at the bottom of said structure, the wall sections of said casing wall structure enclosing and supporting the walls of said tray.

7. A bee hive insulator comprising a separable casing wall structure including wall sections and a flexible wire extending about the exterior of the wall sections, joining said sections together, the free ends of said wire being adapted to be joined together when said structure is placed about a bee hive, and a roof for the wall structure.

8. A bee hive insulator comprising a separable casing wall structure including wall sections and a flexible wire extending about the exterior of the wall sections, joining said sections together, and a roof for the wall structure including a flexible wire extending over the ends of said roof and detachably coupled to the first mentioned wire.

9. In a bee hive insulator, the combination of a bee hive having an entrance for bees, a separable casing wall structure surrounding said bee hive and spaced apart therefrom, said casing wall structure provided with an aperture therethrough, and a hollow covered entrance way carried at one end thereof by said apertured wall structure, said way projecting through said aperture, and carried at the other end thereof by said bee hive and projecting into said entrance for bees.

10. In a bee hive insulator the combination of a bee hive having an entrance for bees, a separable wall structure surrounding said bee hive and spaced apart therefrom, said casing wall structure provided with an aperture therethrough, and a hollow covered entrance way carried at one end thereof by said apertured wall structure, the hollow portion of said covered entrance way aligning with said aperture, and carried at the other end thereof by said bee hive, the hollow portion of said covered entranceway aligning with the entrance for bees.

11. In a bee hive insulator the combination of a bee hive having an entrance for bees, a casing wall structure surrounding said bee hive and spaced apart therefrom, said wall structure provided with an aperture therethrough, a tray positioned at the bottom of said wall structure and provided with an aperture in a wall thereof aligning with the aperture in said wall structure, and a hollow covered entrance way carried at one end thereof by said apertured wall structure, said entrance way passing through said aperture in the wall of said tray and carried at the other end thereof by said bee hive with the hollow portion of said entrance way aligning both with the aperture in said casing wall structure and with the entrance for bees.

12. In a bee hive insulator the combination of a bee hive having an entrance for bees, a wall structure surrounding said bee hive and spaced apart therefrom, said wall structure provided with an aperture therethrough, and a covered entrance way including a hollow rectangular body having a top wall, a bottom wall projecting at one extremity beyond the top wall and end walls projecting at said extremity beyond the top wall and projecting short of the bottom wall, said projecting bottom and end walls carried in said aperture with the extension of said top wall abutting the facing wall of the wall structure, and the opposite extremity of said covered entrance way carried by said bee hive at said entrance for bees.

EMIL J. SIEMERS.